US010684783B2

(12) United States Patent
Tanaka et al.

(10) Patent No.: US 10,684,783 B2
(45) Date of Patent: Jun. 16, 2020

(54) CONTROL METHOD, INFORMATION PROCESSING DEVICE, MANAGEMENT SYSTEM, AND RECORDING MEDIUM

(71) Applicant: Panasonic Intellectual Property Corporation of America, Torrance, CA (US)

(72) Inventors: Akira Tanaka, Osaka (JP); Fumiaki Kagaya, Miyagi (JP); Eiichi Abe, Miyagi (JP); Junichiro Soeda, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/284,224

(22) Filed: Feb. 25, 2019

(65) Prior Publication Data

US 2019/0317677 A1    Oct. 17, 2019

Related U.S. Application Data

(60) Provisional application No. 62/658,862, filed on Apr. 17, 2018.

(30) Foreign Application Priority Data

Nov. 7, 2018  (JP) ................................. 2018-209389

(51) Int. Cl.
*G06F 12/00* (2006.01)
*G06F 3/06* (2006.01)
*G06F 16/23* (2019.01)

(52) U.S. Cl.
CPC .......... *G06F 3/0622* (2013.01); *G06F 3/0659* (2013.01); *G06F 3/0673* (2013.01); *G06F 16/2365* (2019.01)

(58) Field of Classification Search
CPC .. G06F 3/0622; G06F 16/2365; G06F 3/0659; G06F 3/0673
See application file for complete search history.

(56) References Cited

U.S. PATENT DOCUMENTS 9,727,369 B2 * 8/2017 Dice ....................... G06F 9/467
9,824,095 B1 * 11/2017 Taylor ................. G06F 11/1451
2017/0185343 A1 * 6/2017 Ray ....................... G06F 3/0637

FOREIGN PATENT DOCUMENTS

CN         106875518       6/2017
WO         2017/190794     11/2017

OTHER PUBLICATIONS

"GMO Internet Group, Saison Information Systems Co., Ltd., and Parco Co., Ltd. have jointly conducted the second field trial utilizing blockchain and IoT", GMO Internet Inc., [online] https://cloud.z.com/jp/news-ep/iot2/, Jun. 21, 2017 (with partial English translation).

(Continued)

*Primary Examiner* — Arvind Talukdar
(74) *Attorney, Agent, or Firm* — Wenderoth, Lind & Ponack, L.L.P.

(57) ABSTRACT

Provided is a control method of controlling locking or unlocking of storage using a blockchain. The control method includes: determining, when first request information indicating a lock/unlock request, that is a lock request or an unlock request, is received from a terminal, whether a keyholder identified by reading keyholder information stored in the blockchain matches an owner of the terminal that has transmitted the first request information, the keyholder information indicating a person having the authority to lock or unlock the storage; performing lock/unlock processing when the keyholder is determined to match the owner, the lock/unlock processing being processing for causing the storage to lock or unlock in accordance with the (Continued)

first request information; and performing first storage processing after the lock/unlock processing is performed, the first storage processing being processing of storing, in the blockchain, transaction data indicating that the lock/unlock processing has been performed.

10 Claims, 11 Drawing Sheets

(56) References Cited

OTHER PUBLICATIONS

Extended European Search Report dated Aug. 1, 2019 in corresponding European Patent Application No. 19158416.8.

* cited by examiner

CONTROL METHOD, INFORMATION PROCESSING DEVICE, MANAGEMENT SYSTEM, AND RECORDING MEDIUM

CROSS REFERENCE TO RELATED APPLICATION

This application claims the benefit of priority of U.S. Provisional Application No. 62/658,862 filed on Apr. 17, 2018 and Japanese Patent Application Number 2018-209389 filed on Nov. 7, 2018, the entire contents of which are hereby incorporated by reference.

BACKGROUND

1. Technical Field

The present disclosure relates to a control method, an information processing device, a management system, and a recording medium.

2. Description of the Related Art

A technique for managing, using a blockchain, locking or unlocking of storage such as a delivery box that stores items has been disclosed (see GMO Internet Inc., GMO Internet Group, Saison Information Systems Co., Ltd., and Parco Co., Ltd. have jointly conducted the second field trial utilizing blockchain and IoT (GMO Internet Group, Saison Joho Systems, Parco ga kyodo de blockchain to IoT wo katsuyo shita jissho jikken no dainidan wo jisshi), Jun. 21, 2017, retrieved Oct. 25, 2018 from https://cloud.z.com/jp/news-ep/iot2/).

SUMMARY

It, however, requires a relatively long time to lock or unlock the storage.

In view of this, the present disclosure provides an information processing method and the related technologies that can reduce the time required to lock or unlock the storage.

A control method according to an aspect of the present disclosure is a control method of controlling locking or unlocking of storage using a blockchain. The control method includes: determining, when first request information indicating a lock/unlock request is received from a terminal, whether or not a keyholder identified by reading keyholder information stored in the blockchain matches an owner of the terminal that has transmitted the first request information, the lock/unlock request being a lock request or an unlock request, the keyholder information indicating a person having authority to lock or unlock the storage; performing lock/unlock processing when the keyholder is determined to match the owner, the lock/unlock processing being processing for causing the storage to lock or unlock in accordance with the first request information; and performing first storage processing after the lock/unlock processing is performed, the first storage processing being processing of storing, in the blockchain, transaction data indicating that the lock/unlock processing has been performed.

Note that these general or specific aspects may be realized by a system, a device, an integrated circuit, a computer program, or a computer-readable recording medium such as a CD-ROM (compact disc read only memory), or by any combination of systems, devices, integrated circuits, computer programs, and recording media.

A control method according to the present disclosure can reduce the time required to lock or unlock storage.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
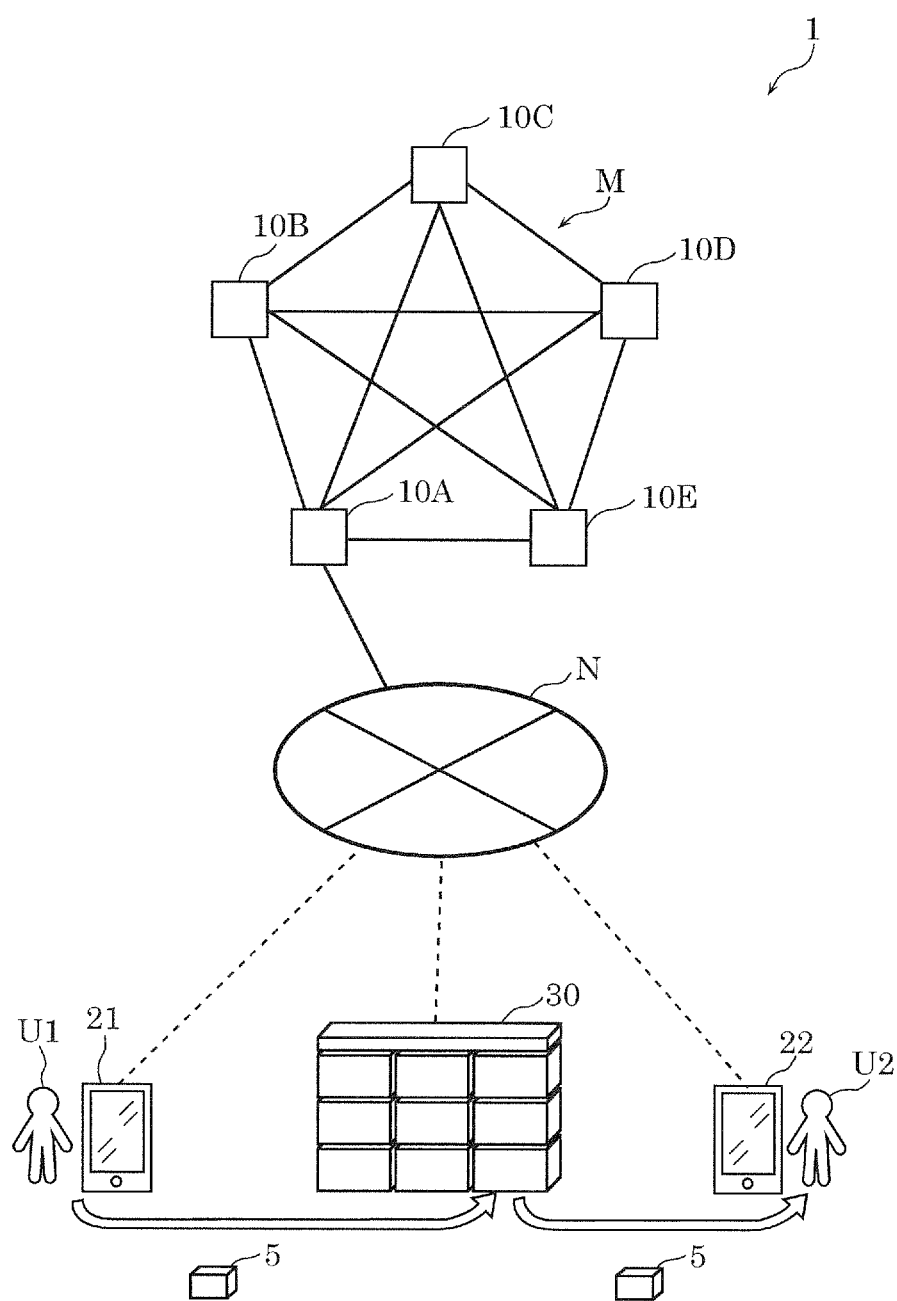
FIG. 1 is a block diagram schematically illustrating a configuration of a management system according to Embodiment 1.

A control method according to an aspect of the present disclosure is a control method of controlling locking or unlocking of storage using a blockchain. The control method includes: determining, when first request information indicating a lock/unlock request is received from a terminal, whether or not a keyholder identified by reading keyholder information stored in the blockchain matches an owner of the terminal that has transmitted the first request information, the lock/unlock request being a lock request or an unlock request, the keyholder information indicating a person having authority to lock or unlock the storage; performing lock/unlock processing when the keyholder is determined to match the owner, the lock/unlock processing being processing for causing the storage to lock or unlock in accordance with the first request information; and performing first storage processing after the lock/unlock processing is performed, the first storage processing being processing of storing, in the blockchain, transaction data indicating that the lock/unlock processing has been performed.

According to the above aspect, the processing of storing transaction data in the blockchain is not included between the reception of a request to lock or unlock the storage and the actual locking or unlocking of the storage. Accordingly, the control method according to an aspect of the present disclosure can reduce the time required to lock or unlock the storage.

For example, the control method may further include: performing second storage processing when second request information indicating a request to change the keyholder information is received from the terminal, the second storage processing being processing of storing the second request information in the blockchain; determining, when the first request information is received, whether or not the second storage processing is currently being performed; and controlling the lock/unlock processing in accordance with a result of the determining.

According to the above aspect, it is possible to control the locking or unlocking of the storage in the unreflected state, that is a state in which the keyholder change is not reflected because the processing for changing the keyholder is currently being performed. Accordingly, it is possible to reduce the time required to lock or unlock the storage, while preventing the storage from being inappropriately locked or unlocked in the unreflected state.

For example, the controlling of the lock/unlock processing may include prohibiting the lock/unlock processing in accordance with the first request information.

According to the above aspect, the locking or unlocking of the storage in the unreflected state is controlled by prohibiting the lock/unlock processing. This makes it possible to more easily prevent the storage from being inappropriately locked or unlocked in the unreflected state.

For example, the controlling of the lock/unlock processing may include standing by until the second storage processing finishes, and performing the lock/unlock processing after the second storage processing finishes.

According to the above aspect, the locking or unlocking of the storage in the unreflected state is controlled by putting the lock/unlock processing on standby until the unreflected state finishes, and locking or unlocking the storage after the keyholder change is reflected. This makes it possible to more easily prevent the storage from being inappropriately locked or unlocked in the unreflected state.

For example, the controlling of the lock/unlock processing may include displaying an image indicating standby until the second storage processing finishes.

According to the above aspect, when the locking or unlocking of the storage in the unreflected state is controlled by putting the lock/unlock processing on standby until the unreflected state finishes, the user can be notified of the standby status through a display image. This allows the user to recognize that the lock/unlock processing is on standby until the unreflected state finishes. Moreover, this can prevent inappropriate operations or the like which may be performed by the user based on false recognition if such display is absent.

For example, the control method according to the above aspect may further include, when the storage has been caused to lock or unlock: obtaining result information indicating whether or not the locking or unlocking has actually been performed; and storing the transaction data in the blockchain only when the result information obtained indicates that the locking or unlocking has actually been performed.

According to the above aspect, the lock history is updated only when the storage is actually locked or unlocked. It is thus possible to reduce the time required to lock or unlock the storage while preventing an update of the lock history if the storage was not actually locked or unlocked due to some circumstances.

For example, the storing of the transaction data in the blockchain may include generating a block including the transaction data, and storing the transaction data in the blockchain when a consensus is reached on the block generated.

According to the above aspect, the management system can store, in the blockchain, a block on which a consensus has been reached among a plurality of servers.

An information processing device according to an aspect of the present disclosure is an information processing device that is one of a plurality of information processing devices and controls locking or unlocking of storage using a blockchain. The information processing device includes a processor, memory, and a storage device that stores a distributed ledger in a form of the blockchain. The blockchain stores keyholder information indicating a person having authority to lock or unlock the storage. The processor, using the memory: determines, when first request information indicating a lock/unlock request is received from a terminal, whether or not a keyholder identified by reading the keyholder information stored in the blockchain matches an owner of the terminal that has transmitted the first request information, the lock/unlock request being a lock request or an unlock request; performs lock/unlock processing when the keyholder is determined to match the owner, the lock/unlock processing being processing for causing the storage to lock or unlock in accordance with the first request information; and performs first storage processing after the lock/unlock processing is performed, the first storage processing being processing of storing, in the blockchain, transaction data indicating that the lock/unlock processing has been performed.

A management system according to an aspect of the present disclosure is a management system including: the plurality of information processing devices including the information processing device described above; and the storage of which locking or unlocking is controlled by the plurality of information processing devices using the blockchain.

According to the above aspect, the same advantageous effects as those of the control method described above are yielded.

A recording medium according to an aspect of the present disclosure is a non-transitory computer-readable recording medium for use in a computer, the recording medium having a computer program recorded thereon for causing the computer to execute the control method described above.

According to the above aspect, the same advantageous effects as those of the control method described above are yielded.

Note that these general or specific aspects may be realized by a system, a device, an integrated circuit, a computer program, or a computer-readable recording medium such as a CD-ROM (compact disc read only memory), or by any combination of systems, devices, integrated circuits, computer programs, or recording media.

The following specifically describes exemplary embodiments with reference to the drawings.

Note that each of the following embodiments shows a general or specific example. The numerical values, shapes, materials, structural elements, the arrangement and connection of the structural elements, steps, the processing order of the steps etc. illustrated in the following embodiments are mere examples, and are not intended to limit the present disclosure. Among the structural elements in the following embodiments, those not recited in any of the independent claims representing the most generic concepts are described as optional structural elements.

Embodiment 1

The present embodiment describes a control method and the related technologies that can reduce the time required to lock or unlock storage. The control method according to the present embodiment is a method of controlling locking or unlocking of one or more storages that can store one or more items, using a distributed ledger. Note that the storages are delivery boxes or coin-operated lockers, for example. Moreover, the control method according to the present embodiment is also applicable to, for example, hotel rooms, offices, houses, and vehicles such as cars, that are locked or unlocked.

FIG. 1 is a block diagram illustrating a configuration of management system 1 according to the present embodiment.

As illustrated in FIG. 1, management system 1 includes servers 10A, 10B, . . . , and 10E, terminals 21 and 22, and storage 30. Servers 10A, 10B, . . . , and 10E are also referred to as "servers 10A etc.", and each of servers 10A etc. is also referred to as "server 10".

Management system 1 manages locking or unlocking of storage 30 when user U1 is to pass item 5 to user U2 using storage 30. The following description assumes an example case where storage 30 is a delivery box and management system 1 manages locking or unlocking of the delivery box. For example, when a recipient is to receive item 5 via a courier, user U1 corresponds to the courier and user U2 corresponds to the recipient.

Each of servers 10A etc. is a server device that is an information processing device that manages locking or unlocking of storage 30 on a computer using a distributed ledger. Each of servers 10A etc. has a ledger for managing the locking or unlocking of storage 30, and updates the ledger while synchronizing its own ledger with ledgers of the other servers 10. The distributed ledger can be realized by blockchain technology having an advantage of difficulty in tampering with recorded information.

Each of the ledgers of servers 10A etc. stores information indicating whether storage 30 is locked or unlocked and keyholder information indicating who is the keyholder, namely, the person having the authority to lock or unlock storage 30. Servers 10A etc. are communicably connected with terminals 21 and 22 and storage 30 via network N. Servers 10A etc. are connected to one another via network M to enable mutual communication. Network M may be connected with network N, or may be network N.

The function to manage the locking or unlocking of storage 30 and the function to manage the keyholder may be implemented through execution of an ordinary computer program code, or may be implemented through execution of a contract code that is a program code recorded on the ledgers, in other words, using a smart contract.

Terminals 21 and 22 are information processing terminals that receive a user's operation for locking or unlocking storage 30 and transmit information to servers 10A etc. Here, it is assumed that terminal 21 is owned by user U1 who is to pass item 5 and terminal 22 is owned by user U2 who is to receive item 5. Terminals 21 and 22 are smartphones or personal computers, for example.

Storage 30 is a temporary storage site used for passing item 5 from user U1 to user U2. It is assumed that the person having the authority to lock or unlock storage 30 is limited to a predetermined number of people. The predetermined number of people is, for example, one as in the following description; however, the predetermined number of people is not limited to one.

Storage 30 includes at least a compartment for storing item 5. Storage 30 is unlocked based on an operation by user U1, and is locked after user U1 stores item 5. Thereafter, storage 30 is unlocked based on an operation by user U2 who then takes out item 5.

The following describes processing performed by management system 1 when, for example, user U1 is to store item 5 in storage 30; however, the same description applies to the case where item 5 is to be taken out from storage 30.

Figure 2:
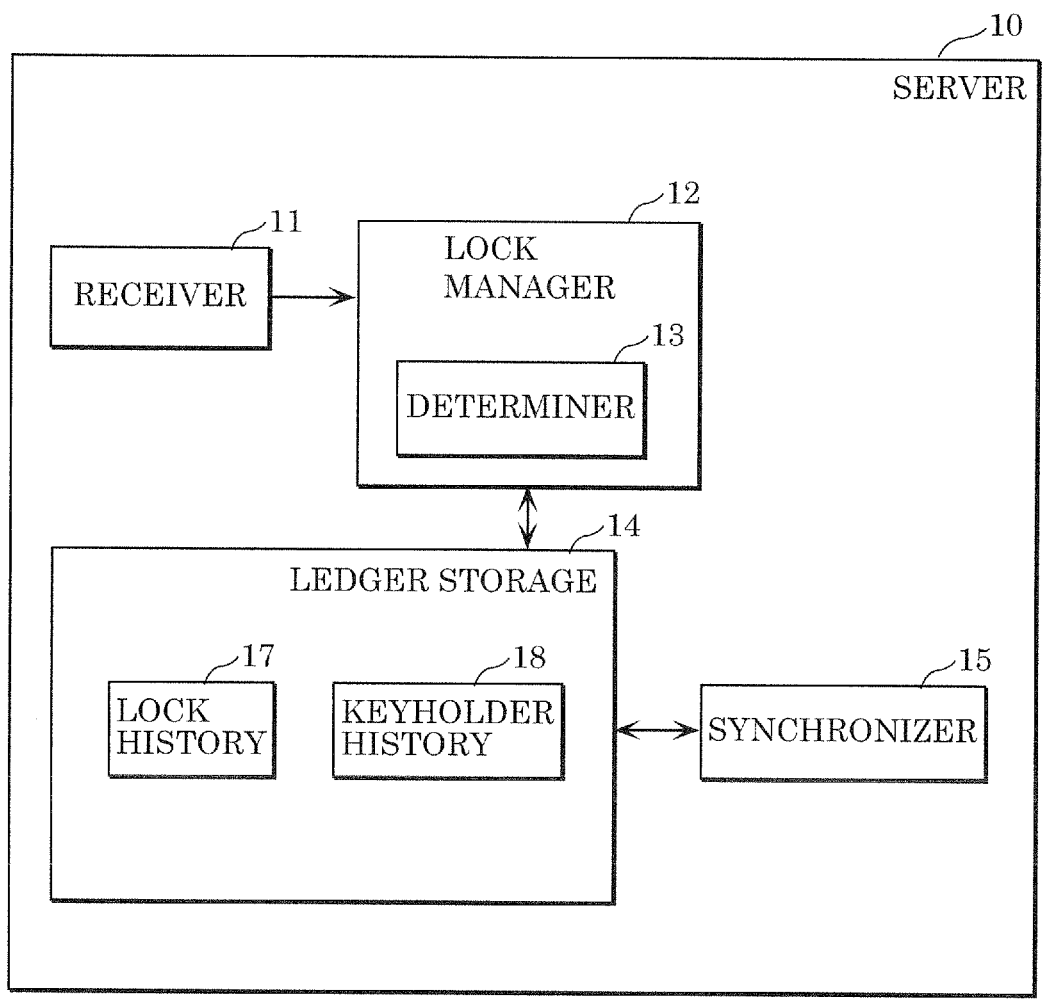
FIG. 2 is a block diagram illustrating a functional configuration of a server according to Embodiment 1.

FIG. 2 is a block diagram illustrating a functional configuration of server 10 according to the present embodiment.

As illustrated in FIG. 2, server 10 includes receiver 11, lock manager 12, ledger storage 14, and synchronizer 15.

Receiver 11 is a processing unit that receives a lock/unlock request, that is a lock request indicating a request for locking storage 30 or an unlock request indicating a request for unlocking storage 30. Receiver 11 can be realized by a processor executing a given program.

Receiver 11 receives request information indicating a lock/unlock request (also referred to as first request information) from terminal 21 of user U1 via a communication interface. When receiver 11 receives the request information, receiver 11 performs authentication processing for authenticating user U1 who has transmitted the request information. The authentication processing uses, for example, identification information of terminal 21, and publicly known technology such as PKI (public-key infrastructure) is applicable to the authentication processing. When user U1 is successfully authenticated, receiver 11 provides the request information to lock manager 12.

Lock manager 12 is a processing unit that manages locking or unlocking of storage 30. Lock manager 12 can be realized by a processor executing a given program. Lock manager 12 includes determiner 13 that determines whether or not the keyholder matches the owner of the terminal that has transmitted the request information. Specifically, when request information indicating an unlock request is received from terminal 21, determiner 13 determines whether or not the keyholder identified by reading the keyholder information stored in ledger storage 14 matches the owner of the terminal that has transmitted the request information.

When determiner 13 determines that the keyholder matches the owner, lock manager 12 performs lock/unlock processing for causing storage 30 to unlock in accordance with the request information. The lock/unlock processing includes transmission of a lock/unlock instruction, that is a lock instruction or an unlock instruction, to storage 30.

Ledger storage 14 stores a distributed ledger. Ledger storage 14 is realized by a storage device such as a HDD (hard disk drive) or an SSD (solid state drive), and a function achieved by a processor executing a given program. The distributed ledger is realized by blockchain that stores transaction data in blocks. Ledger storage 14 stores lock history 17 and keyholder history 18. The latest data of lock history 17 stored in ledger storage 14 indicates the current locked/unlocked state of storage 30. The latest data in keyholder history 18 stored in ledger storage 14 indicates the current keyholder of storage 30.

Synchronizer 15 is a processing unit that stores transaction data in ledger storage 14 while synchronizing ledger storages 14 of a plurality of servers 10. Synchronizer 15 can be realized by a processor executing a given program.

After lock manager 12 performs the lock/unlock processing, synchronizer 15 stores, in lock history 17, transaction data indicating that the lock/unlock processing has been performed. Here, this storage processing is also referred to as first storage processing. When performing the first storage processing, an attempt is made at certain time intervals to reach a consensus with other servers 10 based on a consensus algorithm. When a consensus is successfully reached, synchronizer 15 includes new information in a block that is the unit of recording, and stores the block in ledger storage 14. To reach a consensus by synchronizer 15 and other servers 10, it requires about several minutes to several tens of minutes. Conventional consensus algorithms such as PBFT (practical byzantine fault tolerance) are applicable.

Figure 3:
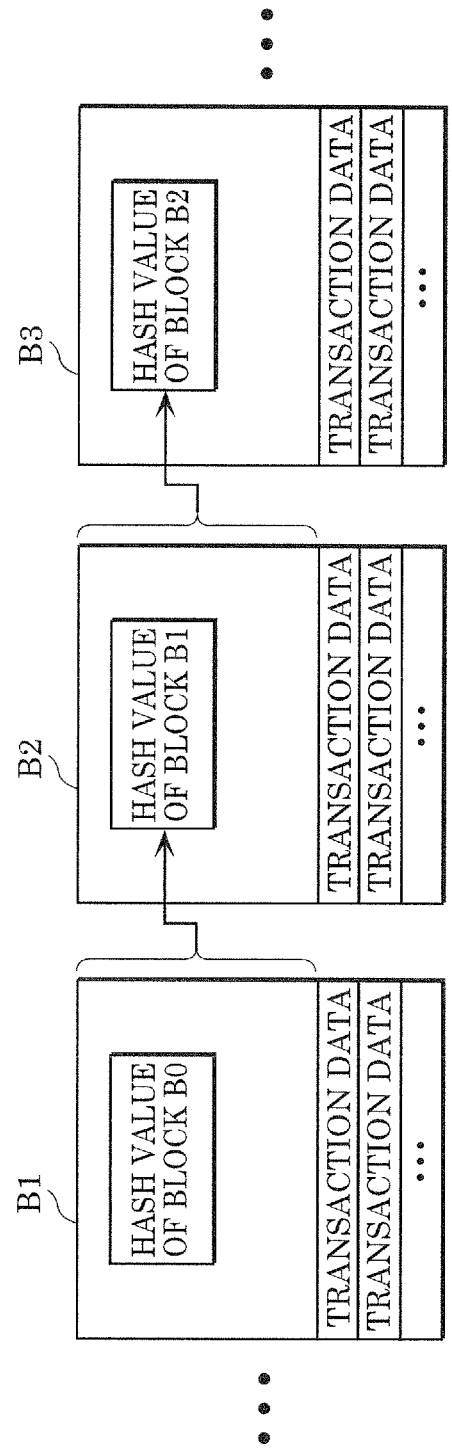
FIG. 3 is an explanatory diagram illustrating a data configuration of a blockchain.

FIG. 3 is an explanatory diagram illustrating a data configuration of a blockchain. FIG. 3 shows three blocks B1, B2, and B3 among blocks included in the blockchain.

The blockchain is a chain of blocks, each of which is the unit of recording. Each block includes a plurality of pieces of transaction data and a hash value of the immediately preceding block. Specifically, block B2 includes a hash value of the preceding block B1. A hash value calculated based on a plurality of pieces of transaction data included in block B2 and the hash value of block B1 is included in block B3 as the hash value of block B2. By connecting blocks like a chain while including the content of the preceding block as a hash value as described above, tampering with the stored transaction data is effectively prevented.

If the past transaction data stored in a block of the blockchain is modified, the hash value of the block changes from the hash value before the modification. To make the tampered block look genuine, all the subsequent blocks must be remade, which is very difficult in reality.

Figure 4:
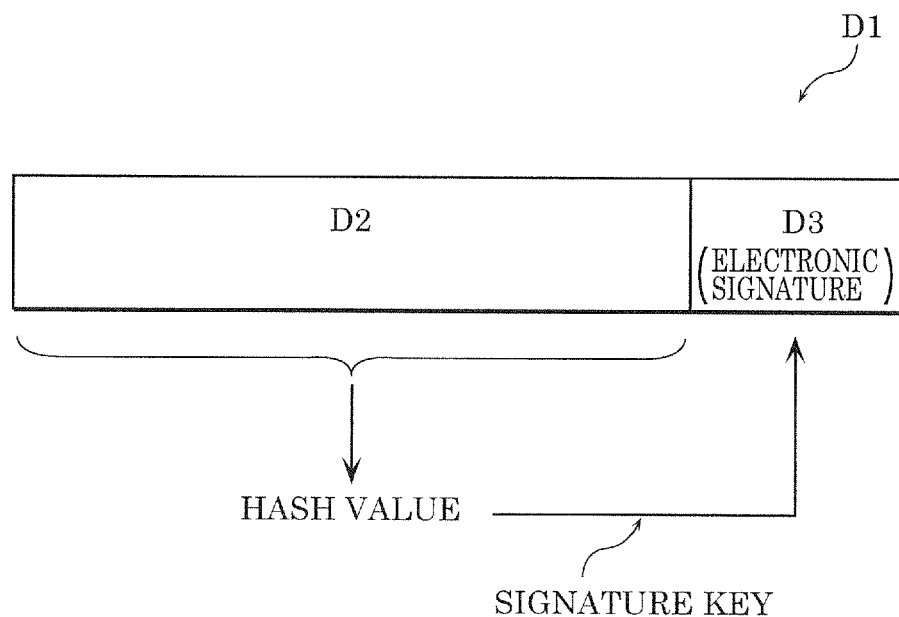
FIG. 4 is an explanatory diagram illustrating a data configuration of transaction data.

FIG. 4 is an explanatory diagram illustrating a data configuration of transaction data D1.

Transaction data D1 illustrated in FIG. 4 includes data field D2 indicating the content of transaction, and signature field D3.

Data field D2 includes (i) data indicating a history of locking or unlocking or (ii) data indicating a history of change of the keyholder.

Signature field D3 includes an electronic signature generated by encrypting, with a signature key of a person who has generated data field D2, the hash value of the data included in data field D2.

Transaction data D1 that includes data indicating locking or unlocking corresponds to lock history 17, and transaction data D1 that includes data indicating a change of the keyholder corresponds to keyholder history 18.

Figure 5:
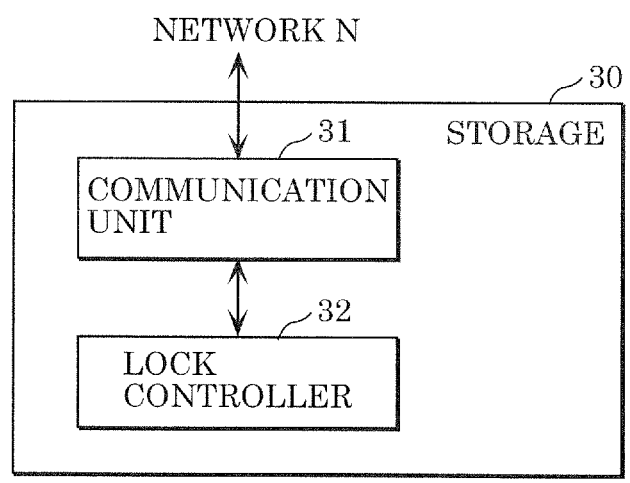
FIG. 5 is a block diagram schematically illustrating a configuration of storage according to Embodiment 1.

FIG. 5 is a block diagram schematically illustrating a configuration of storage 30 according to the present embodiment.

As illustrated in FIG. 5, storage 30 includes communication unit 31 and lock controller 32.

Communication unit 31 is a communication interface device communicably connected with another device. Communication unit 31 is connected to network N and is communicable with server 10 via network N.

Lock controller 32 controls whether to lock or unlock storage 30. When lock controller 32 receives an unlock instruction from lock manager 12 of server 10 via communication unit 31, lock controller 32 unlocks storage 30 in accordance with the unlock instruction received. When lock controller 32 receives a lock instruction from lock manager 12 of server 10, lock controller 32 locks storage 30 in accordance with the lock instruction received.

The following describes processing performed by management system 1 configured as above, while comparing with a comparative example.

Figure 6:
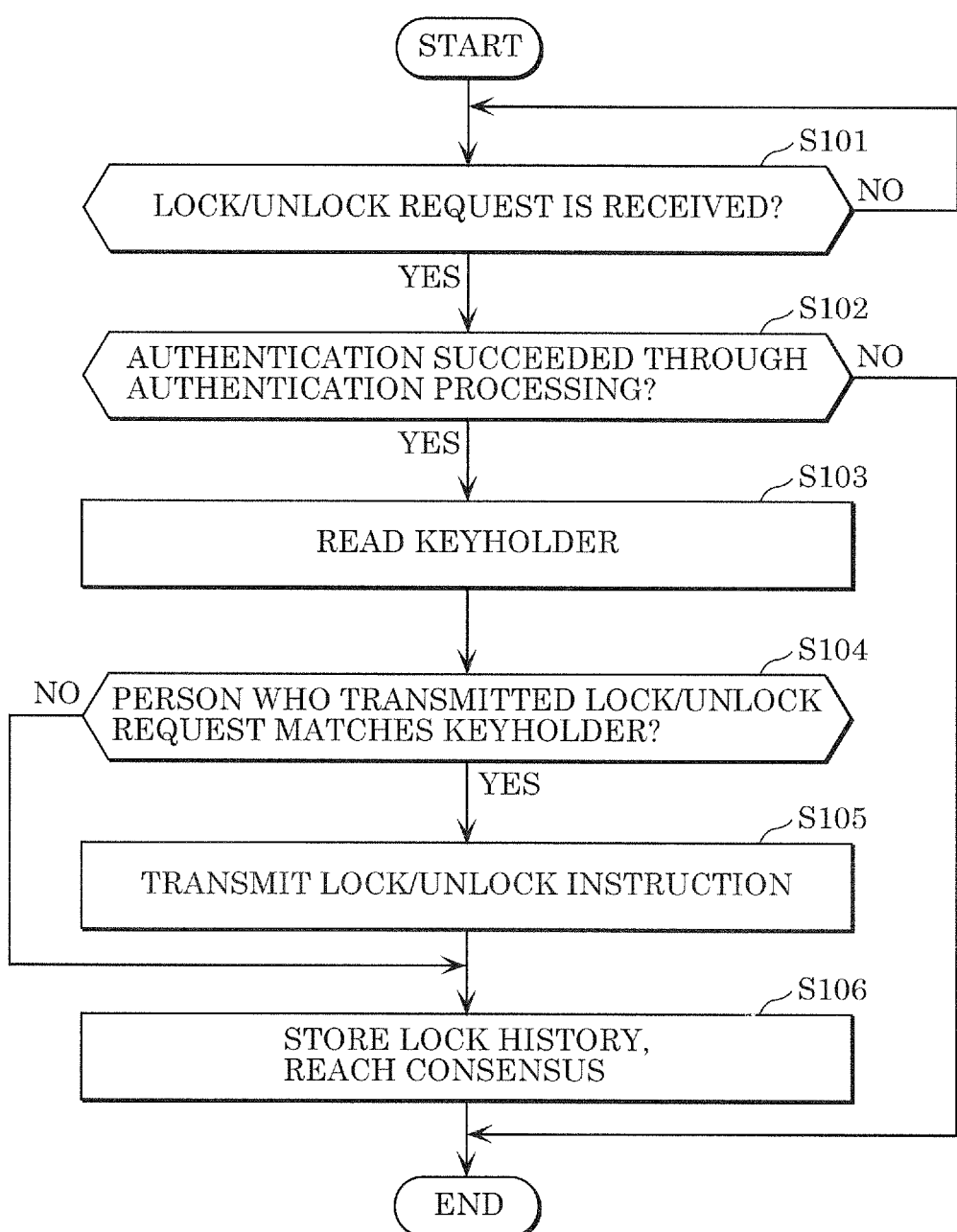
FIG. 6 is a flow chart illustrating locking or unlocking by the management system according to Embodiment 1.

FIG. 6 is a flow chart illustrating the locking or unlocking by management system 1 according to the present embodiment. A series of processing illustrated in FIG. 6 is processing performed when user U1 is to unlock storage 30 which is in the locked state.

As illustrated in FIG. 6, in Step S101, receiver 11 determines whether or not a lock/unlock request, that is a lock request or an unlock request, has been received from terminal 21. If receiver 11 determines that a lock/unlock request has been received (YES in Step S101), the processing proceeds to Step S102, and if not (NO in Step S101), receiver 11 performs Step S101 again. That is to say, receiver 11 stands by in Step S101 until a lock/unlock request is received from terminal 21. The following description assumes that an unlock request has been received.

In Step S102, receiver 11 performs authentication processing on user U1 who has transmitted the unlock request received in Step S101, and determines whether or not the authentication processing succeeds. If receiver 11 determines that the authentication processing has succeeded (YES in Step S102), the processing proceeds to Step S103, and if not (NO in Step S102), the series of processing illustrated in FIG. 6 is ended.

In Step S103, determiner 13 determines whether or not user U1 of terminal 21 that has transmitted the unlock request received in Step S101 matches the current keyholder. The current keyholder is identified by reading keyholder history 18 in ledger storage 14.

In Step S104, if determiner 13 determines in Step S103 that the person who has transmitted the unlock request matches the current keyholder (YES in Step S104), the processing proceeds to Step S105, and if not (NO in Step S104), the processing proceeds to Step S106.

In Step S105, lock manager 12 transmits an unlock instruction to storage 30 based on the unlock request received in Step S101.

In Step S106, lock manager 12 stores history information indicating that storage 30 has been unlocked, in lock history 17 stored in ledger storage 14. The storage of lock history 17 is performed after update information of lock history 17 is transmitted to other servers 10 etc. and a consensus is reached based on a consensus algorithm. Note that the storage of the history information in lock history 17 in Step S106 may be performed only if result information indicating that storage 30 has actually unlocked in response to the unlock instruction transmitted in Step S105 is received.

Note that although the processing for unlocking the locked storage 30 has been described above, the same processing is performed when the unlocked storage 30 is to be locked. In that case, the unlock request and the unlock instruction in the above description are replaced with the lock request and the lock instruction as appropriate.

In FIG. 6, the series of processing from Step S101 to Step S106 is performed; however, the unlock processing from Step S101 to S105 may be performed as a series of processing, and the storing processing and the consensus reaching processing in Step S106 may be performed independently of the series of processing Step S101 to S105 in terms of timing.

Figure 7:
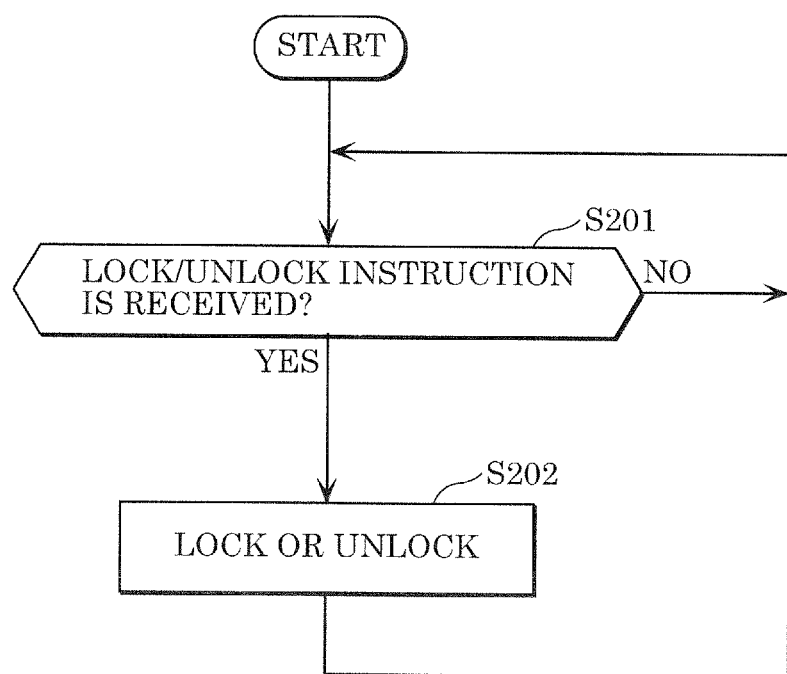
FIG. 7 is a flow chart illustrating locking or unlocking of the storage according to Embodiment 1.

FIG. 7 is a flow chart illustrating locking or unlocking of storage 30 according to the present embodiment.

As illustrated in FIG. 7, in Step S201, lock controller 32 determines whether or not a lock/unlock instruction has been received from server 10. If a lock/unlock instruction has been received, the processing proceeds to Step S202, and if not, Step S201 is performed again. That is to say, lock controller 32 stands by in Step S201 until a lock/unlock instruction is received from server 10.

In Step S202, lock controller 32 locks or unlocks storage 30 based on the lock/unlock instruction received in Step S201. When the processing in Step S202 is finished, Step S201 is performed again.

The following describes locking or unlocking by a management system according to a comparative example. The management system according to the comparative example is an example of a system equivalent to a conventional management system, and is different from management system 1 according to the present embodiment in terms of timing of storing the lock history. In the following description, the structural elements of the management system according to the comparative example are given the same names as in management system 1 of the present embodiment, but are given no reference signs.

Figure 8:
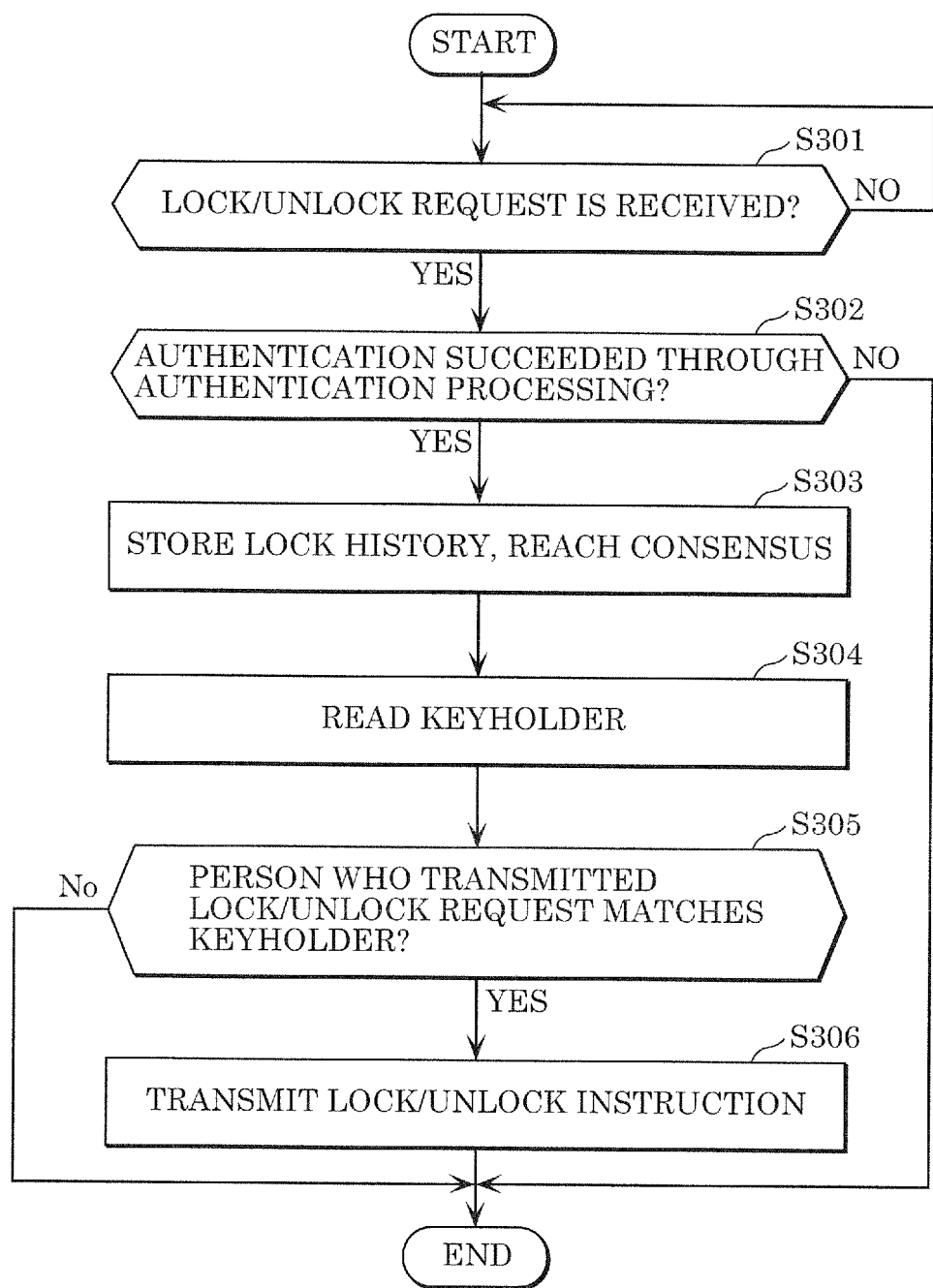
FIG. 8 is a flow chart illustrating locking or unlocking by a management system according to a comparative example.

FIG. 8 is a flow chart illustrating the locking or unlocking by the management system according to the comparative example.

Steps S301 and S302 are the same as Steps S101 and 102 of management system 1. The following description assumes that an unlock request has been received in Step S301.

In Step S303, the lock manager stores the request information indicating a lock/unlock request received in Step S301, in the lock history stored in the ledger storage. The storage of the lock history is performed after update information of the lock history is transmitted to other servers and a consensus is reached based on a consensus algorithm.

In Step S304, the determiner determines whether or not the person who has transmitted the unlock request received in Step S301 matches the current keyholder. The current keyholder is identified by reading the keyholder information stored in the ledger storage.

In Step S305, if the determiner determines in Step S304 that the person who has transmitted the unlock request matches the current keyholder (YES in Step S305), the processing proceeds to Step S306, and if not (NO in Step S305), the series of processing illustrated in FIG. 8 is ended.

In Step S306, the lock manager transmits an unlock instruction to storage 30 based on the unlock request received in Step S301.

As can be understood from above, the management system according to the comparative example requires several minutes to several tens of minutes to perform the consensus reaching processing in Step S303. That is to say, a time period exceeding about several minutes to several tens of minutes is required between the reception of a lock/unlock request and the actual locking or unlocking of storage 30.

In contrast, with management system 1 according to the present embodiment, the consensus reaching processing is not included between the reception of a lock/unlock request and the actual locking or unlocking of storage 30. Thus, the time period between the reception of a lock/unlock request and the actual locking or unlocking of storage 30 can be reduced to a relatively short period of time, for example, about one second or less.

Note that the above description has focused on the processing performed by management system 1 when user U1 is to store item 5 in storage 30; however, the same description applies to the case where user U2 is to take out item 5 from storage 30.

As described above, with the control method according to the present embodiment, the processing of storing transaction data in the blockchain is not included between the reception of a request to lock or unlock the storage and the actual locking or unlocking of the storage. Accordingly, the control method according to an aspect of the present disclosure can reduce the time required to lock or unlock the storage.

The lock history is updated only when the storage is actually locked or unlocked. It is thus possible to reduce the time required to lock or unlock the storage while preventing an update of the lock history if the storage was not actually locked or unlocked due to some circumstances.

The management system can store, in the blockchain, a block on which a consensus has been reached among a plurality of servers.

Embodiment 2

Regarding a control method and the related technologies that can reduce the time required to lock or unlock the storage, the present embodiment describes a technique by which the storage can be appropriately locked or unlocked after a change of the keyholder.

Server 10F according to the present embodiment is partially different from server 10 according to Embodiment 1. The following describes server 10F etc., while mainly focusing on the difference from server 10.

Figure 9:
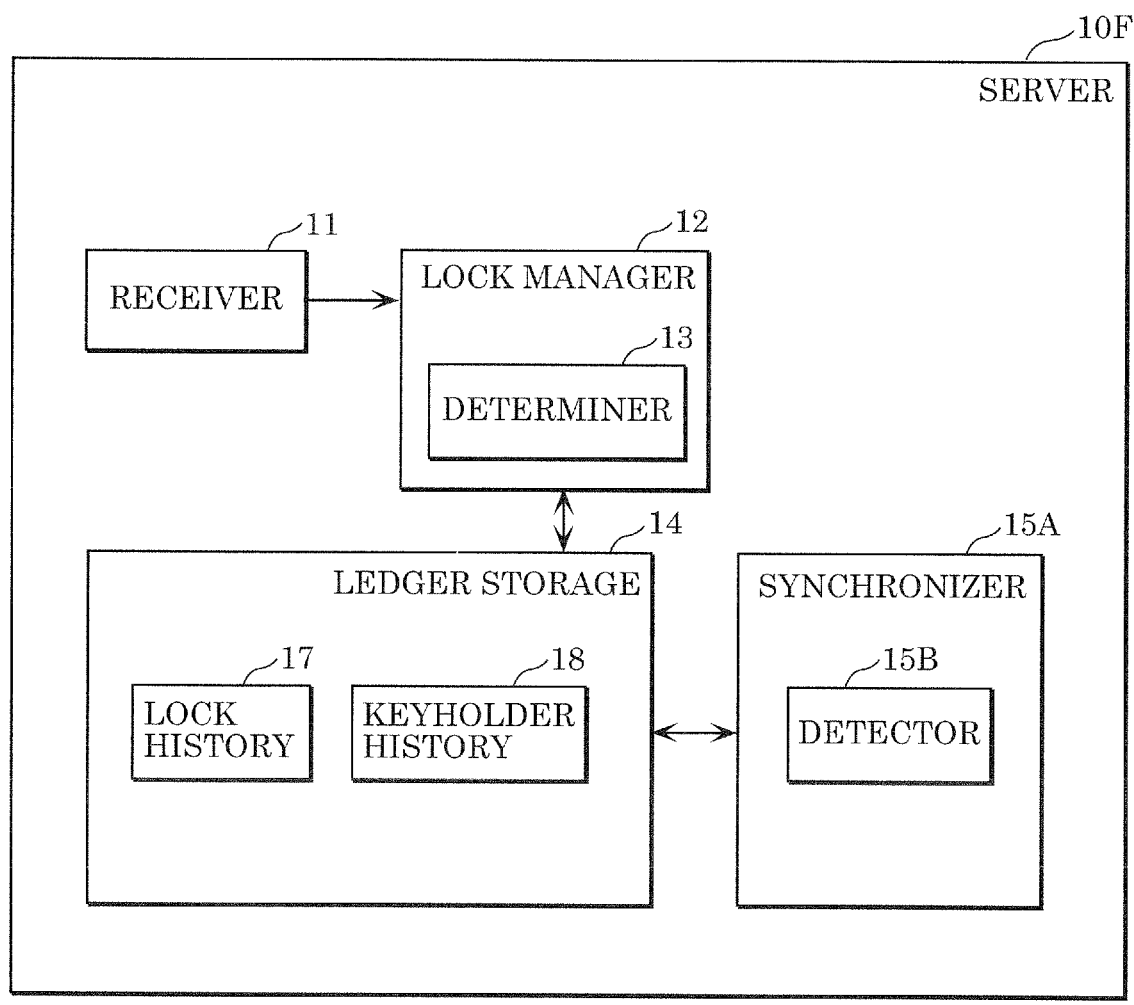
FIG. 9 is a block diagram illustrating a functional configuration of a server according to Embodiment 2.

FIG. 9 is a block diagram illustrating a functional configuration of server 10F according to the present embodiment.

As illustrated in FIG. 9, server 10F includes receiver 11, lock manager 12, ledger storage 14, and synchronizer 15A. Among the functional elements of server 10F, synchronizer 15A is different from synchronizer 15 included in server 10.

Synchronizer 15A has the same function as that of synchronizer 15 in Embodiment 1, but further includes detector 15B.

As with synchronizer 15, synchronizer 15A stores, in ledger storage 14, information to be stored in ledger storage 14, after reaching a consensus with other servers 10F etc. The information held by synchronizer 15A as information to be stored in ledger storage 14 is request information indicating a lock/unlock request and request information indicating a request to change the keyholder (also referred to as second request information). Here, the processing of storing transaction data indicating a request to change the keyholder in ledger storage 14 after reaching a consensus with other servers 10F is also referred to as second storage processing.

Detector 15B is a processing unit that detects, from the information that is temporarily held by synchronizer 15A and is to be stored in ledger storage 14, the transaction data indicating a request to change the keyholder.

When the request information indicating a request to lock or unlock storage 30 has been received, synchronizer 15A determines, using detector 15B, whether or not the second storage processing is currently being performed, that is, whether or not the processing of storing the transaction data that is included in the information to be stored in ledger storage 14 and indicates a request to change the keyholder is currently being performed. Then, lock manager 12 controls the lock/unlock processing for storage 30 in accordance with the result of determination by detector 15B.

The control on the lock/unlock processing may include, for example, prohibiting the lock/unlock processing in accordance with the first request information.

The control on the lock/unlock processing may include, for example, standing by until the second storage processing finishes, and performing the lock/unlock processing after the second storage processing finishes.

The control on the lock/unlock processing may include, for example, displaying an image indicating standby until the second storage processing finishes. The image is displayed by terminal 21 of user U1, for example. In that case, synchronizer 15A transmits a signal for displaying the image, to terminal 21 via a communication interface (not illustrated).

Figure 10:
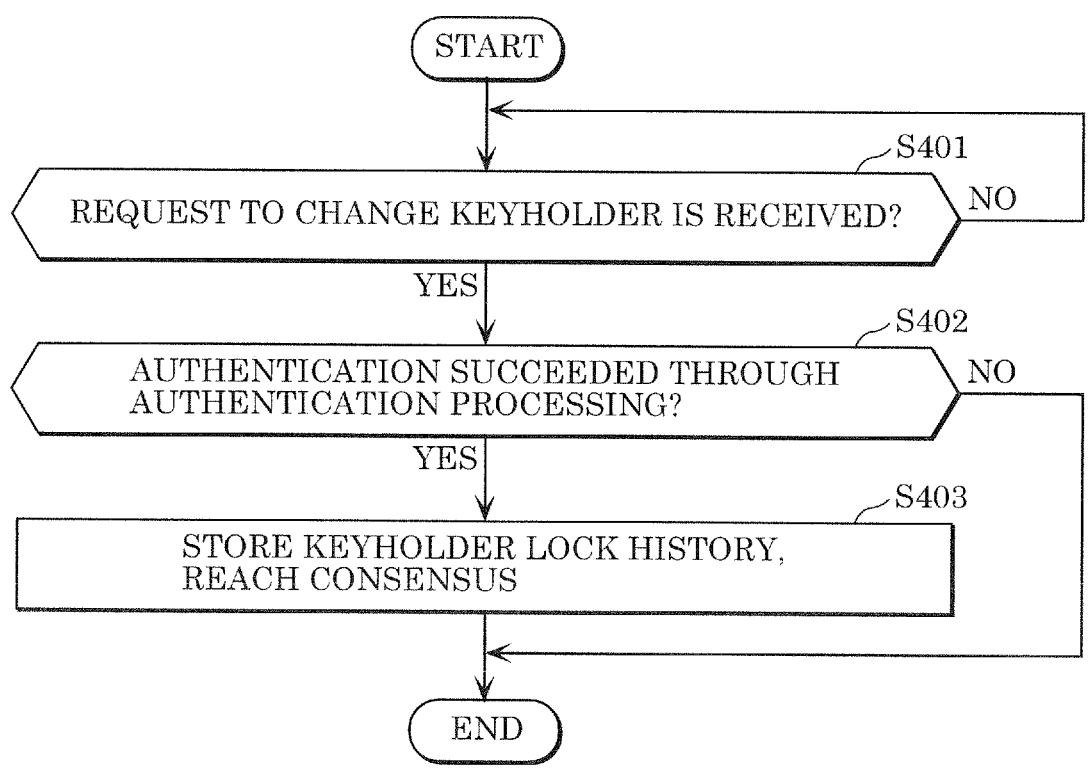
FIG. 10 is a flow chart illustrating processing for changing a keyholder, performed by a management system according to Embodiment 2.

FIG. 10 is a flow chart illustrating processing for changing the keyholder, performed by management system 2 according to the present embodiment.

As illustrated in FIG. 10, in Step S401, receiver 11 determines whether or not a request to change the keyholder (also simply referred to as a change request) has been received from terminal 21. If receiver 11 determines that the change request has been received (YES in Step S401), the processing proceeds to Step S402, and if not (NO in Step S401), receiver 11 performs Step S401 again. That is to say, receiver 11 stands by in Step S401 until the change request is received from terminal 21.

In Step S402, receiver 11 performs authentication processing on user U1 who has transmitted the change request received in Step S401, and determines whether or not the authentication processing succeeds. If receiver 11 determines that the authentication processing has succeeded (YES in Step S402), the processing proceeds to Step S403, and if not (NO in Step S402), the series of processing illustrated in FIG. 10 is ended.

In Step S403, lock manager 12 performs processing of changing the keyholder based on the change request received in Step S401. Specifically, lock manager 12 performs storage processing of storing, in keyholder history 18, transaction data indicating a request to change the keyholder. In the storage processing, the transaction data is generated and stored in keyholder history 18 after a consensus is reached by synchronizer 15A and other servers 10F based on a consensus algorithm. The time required to reach a consensus depends on the type of blockchain software, and is, for example, about several minutes to several tens of minutes.

Thus, the change request from the user is not reflected in keyholder history 18 during a time period between the reception of the change request in Step S401 and the storage of keyholder history information in ledger storage 14 in Step S403. This state is also referred to as an unreflected state.

If a lock/unlock request to lock or unlock storage 30 is received from user U2 in the unreflected state in which the change of the keyholder from user U1 to user U2 is not reflected yet, storage 30 cannot be locked or unlocked in response to the request.

Figure 11:
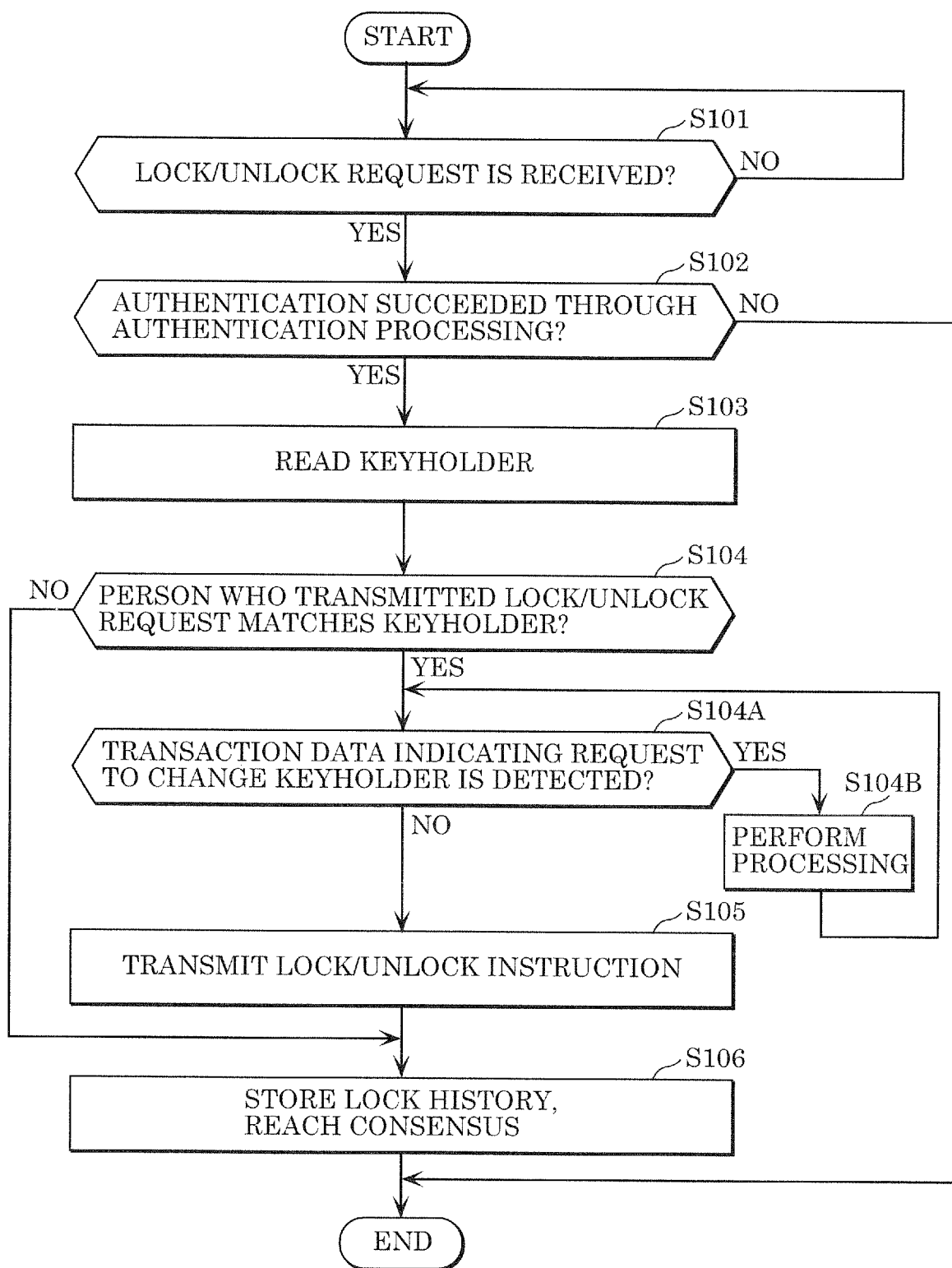
FIG. 11 is a flow chart illustrating lock/unlock processing performed by the management system according to Embodiment 2.

FIG. 11 is a flow chart illustrating the lock/unlock processing performed by management system 2 according to the present embodiment. The series of processing illustrated in FIG. 11 is partially different from the lock/unlock processing performed by management system 1 according to Embodiment 1 (see FIG. 6).

Steps S101 to S104 and S105 to S106 illustrated in FIG. 11 are the same as those in FIG. 6.

In Step S104A, detector 15B attempts to detect transaction data indicating a request to change the keyholder, from information that is held by synchronizer 15A and is to be stored in ledger storage 14. Synchronizer 15A determines whether or not detector 15B has detected the transaction data. If synchronizer 15A determines that detector 15B has detected the transaction data (YES in Step S104A), the processing proceeds to Step S104B, and if not (NO in Step S104A), the processing proceeds to Step S105.

In Step S104B, management system 2 performs predetermined processing. The predetermined processing is, for example, to end, at this point in time, the series of processing illustrated in FIG. 11. Performing this processing is equivalent to performing control to prohibit the lock/unlock processing for storage 30, the request for which has been received in Step S101.

The predetermined processing may be to stand by for a predetermined time period. In that case, detector 15B performs Step S104A again after a lapse of the predetermined time period. As a result, lock manager 12 puts the lock/unlock processing for storage 30 on standby until the change request is reflected, and performs control to transmit a lock/unlock instruction after the standby.

The processing illustrated in FIG. 11 enables prohibition or standby of the lock/unlock processing in the above-described unreflected state. This yields an advantage of preventing the lock/unlock processing in the unreflected state.

As described above, the control method according to the present embodiment enables control on the locking or unlocking of the storage in the unreflected state, that is a state in which the keyholder change is not reflected because the processing for changing the keyholder is currently being performed. Accordingly, it is possible to reduce the time required to lock or unlock the storage, while preventing the storage from being inappropriately locked or unlocked in the unreflected state.

The locking or unlocking of the storage in the unreflected state is controlled by prohibiting the lock/unlock processing. This makes it possible to more easily prevent the storage from being inappropriately locked or unlocked in the unreflected state.

The locking or unlocking of the storage in the unreflected state is controlled by putting the lock/unlock processing on standby until the unreflected state finishes, and locking or unlocking the storage after the keyholder change is reflected. This makes it possible to more easily prevent the storage from being inappropriately locked or unlocked in the unreflected state.

When the locking or unlocking of the storage in the unreflected state is controlled by putting the lock/unlock processing on standby until the unreflected state finishes, the user can be notified of the standby status through a display image. This allows the user to recognize that the lock/unlock processing is on standby until the unreflected state finishes. Moreover, this can prevent inappropriate operations or the like which may be performed by the user based on false recognition if such display is absent.

Variation of Each Embodiment

The present variation describes a control method and an information processing device according to a variation of each embodiment described above.

Figure 12:
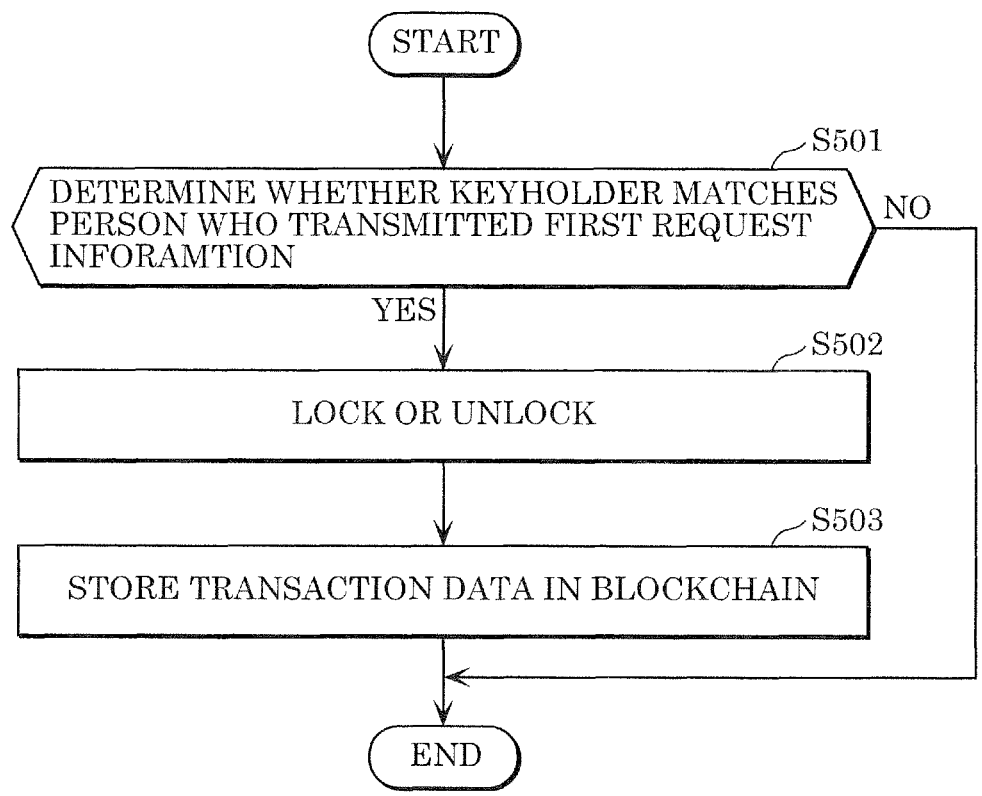
FIG. 12 is a flow chart illustrating a control method according to a variation of each embodiment.

FIG. 12 is a flow chart illustrating the control method according to the present variation.

As illustrated in FIG. 12, the control method according to the present variation is a method for controlling locking or unlocking of storage using a blockchain. Here, the blockchain stores keyholder information indicating a person who has the authority to lock or unlock the storage.

In Step S501, when the first request information indicating a lock/unlock request is received from a terminal, it is determined whether or not the keyholder identified by reading the keyholder information stored in the blockchain matches the owner of the terminal that has transmitted the first request information. When it is determined that the keyholder matches the owner, the processing proceeds to Step S502.

In Step S502, the lock/unlock processing is performed for causing the storage to lock or unlock in accordance with the first request information.

In Step S503, after the lock/unlock processing is performed, the first storage processing is performed to store, in the blockchain, transaction data indicating that the lock/unlock processing has been performed.

This can reduce the time required to lock or unlock the storage.

Figure 13:
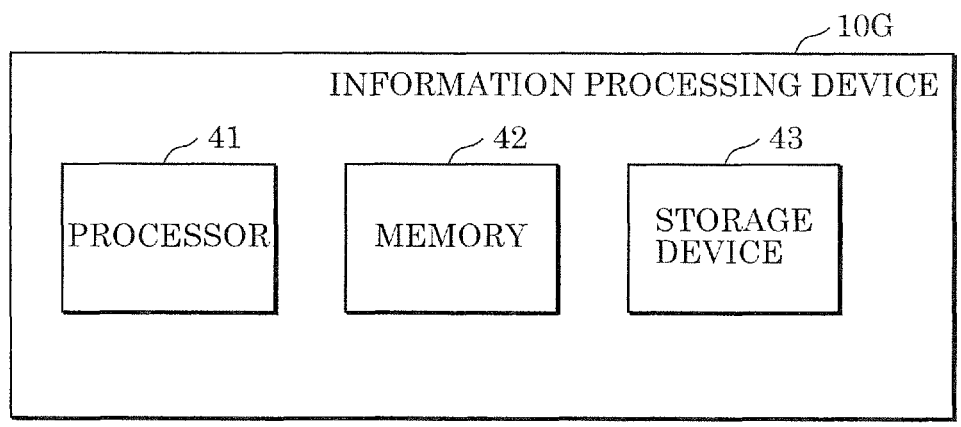
FIG. 13 is a block diagram illustrating a configuration of an information processing device according to the variation of each embodiment.

FIG. 13 is a block diagram illustrating a configuration of information processing device 10G according to the present variation.

As illustrated in FIG. 13, information processing device 10G according to the present variation is one of a plurality of information processing devices that controls locking or unlocking of storage using a blockchain.

Information processing device 10G includes processor 41, memory 42, and storage device 43 that stores a distributed ledger in the form of a blockchain. The blockchain stores keyholder information indicating a person who has the authority to lock or unlock the storage.

When processor 41 receives, using memory 42, the first request information indicating a lock/unlock request from a terminal, processor 41 determines, using memory 42, whether or not the keyholder identified by reading the keyholder information stored in the blockchain matches the owner of the terminal that has transmitted the first request information.

When processor 41 determines that the keyholder matches the owner, processor 41 performs, using memory 42, the lock/unlock processing for causing the storage to lock or unlock in accordance with the first request information.

After performing the lock/unlock processing, processor 41 performs, using memory 42, the first storage processing to store, in the blockchain, transaction data indicating that the lock/unlock processing has been performed.

This can reduce the time required to lock or unlock the storage.

Note that each of the structural elements in the above embodiments may be configured in the form of an exclusive hardware product, or may be implemented by executing a software program suitable for each structural element. Each of the structural elements may be implemented by means of a program executing unit, such as a CPU or a processor, reading and executing the software program recorded on a recording medium such as a hard disk or a semiconductor memory. The software that implements the information processing device etc. in the above embodiments is a program as follows:

That is to say, this program causes a computer to perform a control method of controlling locking or unlocking of storage using a blockchain. The control method includes: determining, when first request information indicating a lock/unlock request is received from a terminal, whether or not a keyholder identified by reading keyholder information stored in the blockchain matches an owner of the terminal that has transmitted the first request information, the lock/unlock request being a lock request or an unlock request, the keyholder information indicating a person having authority to lock or unlock the storage; performing lock/unlock processing when the keyholder is determined to match the owner, the lock/unlock processing being processing for causing the storage to lock or unlock in accordance with the first request information; and performing first storage processing after the lock/unlock processing is performed, the first storage processing being processing of storing, in the blockchain, transaction data indicating that the lock/unlock processing has been performed.

While the foregoing has described the control method and the related technologies according to one or more aspects of the present disclosure based on exemplary embodiments, the present disclosure is not limited to these embodiments. Various modifications to these embodiments conceivable to those skilled in the art, as well as embodiments resulting from combinations of structural elements in different embodiments may be included within the scope of one or more aspects of the present disclosure, so long as they do not depart from the essence of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, a control method that can reduce the time required to lock or unlock storage. Specifically, the present disclosure is applicable to, for example, a locker available for public use.

What is claimed is:

1. A control method of controlling locking or unlocking of storage using a blockchain, the control method comprising:
   determining, when first request information indicating a lock/unlock request is received from a terminal, whether or not a keyholder identified by reading keyholder information stored in the blockchain matches an owner of the terminal that has transmitted the first request information, the lock/unlock request being a lock request or an unlock request, the keyholder information indicating a person having authority to lock or unlock the storage;
   performing lock/unlock processing when the keyholder is determined to match the owner, the lock/unlock processing being processing for causing the storage to lock or unlock in accordance with the first request information; and
   performing first storage processing after the lock/unlock processing is performed, the first storage processing being processing of storing, in the blockchain, transaction data indicating that the lock/unlock processing has been performed.

2. The control method according to claim 1, further comprising:
   performing second storage processing when second request information indicating a request to change the keyholder information is received from the terminal, the second storage processing being processing of storing the second request information in the blockchain;
   determining, when the first request information is received, whether or not the second storage processing is currently being performed; and
   controlling the lock/unlock processing in accordance with a result of the determining.

3. The control method according to claim 2, wherein the controlling of the lock/unlock processing includes prohibiting the lock/unlock processing in accordance with the first request information.

4. The control method according to claim 2, wherein the controlling of the lock/unlock processing includes standing by until the second storage processing finishes, and performing the lock/unlock processing after the second storage processing finishes.

5. The control method according to claim 4, wherein the controlling of the lock/unlock processing includes displaying an image indicating standby until the second storage processing finishes.

6. The control method according to claim 1, further comprising, when the storage has been caused to lock or unlock:
obtaining result information indicating whether or not the locking or unlocking has actually been performed; and
storing the transaction data in the blockchain only when the result information obtained indicates that the locking or unlocking has actually been performed.

7. The control method according to claim 1, wherein the storing of the transaction data in the blockchain includes
generating a block including the transaction data, and storing the transaction data in the blockchain when a consensus is reached on the block generated.

8. An information processing device that is one of a plurality of information processing devices and controls locking or unlocking of storage using a blockchain, the information processing device comprising:
a processor;
memory; and
a storage device that stores a distributed ledger in a form of the blockchain, wherein
the blockchain stores keyholder information indicating a person having authority to lock or unlock the storage, and
the processor, using the memory:
determines, when first request information indicating a lock/unlock request is received from a terminal, whether or not a keyholder identified by reading the keyholder information stored in the blockchain matches an owner of the terminal that has transmitted the first request information, the lock/unlock request being a lock request or an unlock request;
performs lock/unlock processing when the keyholder is determined to match the owner, the lock/unlock processing being processing for causing the storage to lock or unlock in accordance with the first request information; and
performs first storage processing after the lock/unlock processing is performed, the first storage processing being processing of storing, in the blockchain, transaction data indicating that the lock/unlock processing has been performed.

9. A management system, comprising:
the plurality of information processing devices including the information processing device according to claim 8; and
the storage of which locking or unlocking is controlled by the plurality of information processing devices using the blockchain.

10. A non-transitory computer-readable recording medium for use in a computer, the recording medium having a computer program recorded thereon for causing the computer to execute the control method according to claim 1.

* * * * *